United States Patent
Hao et al.

(10) Patent No.: US 12,085,709 B2
(45) Date of Patent: Sep. 10, 2024

(54) METHOD AND MEANS FOR CONTROLLING DEFORMABLE MIRROR SURFACE SHAPE BASED ON RADIAL PRIMARY FUNCTION

(71) Applicant: Beijing Institute of Technology, Beijing (CN)

(72) Inventors: Qun Hao, Beijing (CN); Xuemin Cheng, Beijing (CN); Yao Hu, Beijing (CN); Xu Chang, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 498 days.

(21) Appl. No.: 17/617,318

(22) PCT Filed: Feb. 8, 2021

(86) PCT No.: PCT/CN2021/075988
§ 371 (c)(1),
(2) Date: Dec. 8, 2021

(87) PCT Pub. No.: WO2021/160085
PCT Pub. Date: Aug. 19, 2021

(65) Prior Publication Data
US 2022/0317437 A1 Oct. 6, 2022

(30) Foreign Application Priority Data
Feb. 12, 2020 (CN) .......................... 202010089331.2

(51) Int. Cl.
*G02B 26/08* (2006.01)
*G06N 3/08* (2023.01)

(52) U.S. Cl.
CPC ........... *G02B 26/0825* (2013.01); *G06N 3/08* (2013.01)

(58) Field of Classification Search
CPC .... G02B 26/0825; G02B 7/188; G02B 26/06; G06N 3/08; G06N 3/084; G06N 3/04; Y02T 90/00
See application file for complete search history.

(56) References Cited

U.S. PATENT DOCUMENTS

2005/0117189 A1 6/2005 Murakawa et al.
2013/0322471 A1* 12/2013 Rossbach ........... G02B 26/0825
359/849

FOREIGN PATENT DOCUMENTS

CN 108983412 A 12/2018
CN 109031654 A 12/2018
(Continued)

OTHER PUBLICATIONS

Shi Xiaoyu, et al., Predicting control voltages of deformable mirror in adaptive optical system, High Power Laser and Particle Beams, Jun., 2012, pp. 1281-1286, vol. 24 No. 6.

*Primary Examiner* — Euncha P Cherry
(74) *Attorney, Agent, or Firm* — Bayramoglu Law Offices LLC

(57) ABSTRACT

A method for controlling a deformable mirror surface shape based on a radial primary function processes samples of a neural network training set, obtains elements of the neural network training set, characterizes the complex surface shape of the deformable mirror in each sample by using a radial primary function, takes characterization parameters of the surface shape in the each sample as an input of a neural network, and trains the neural network by taking a voltage of each piezoelectric ceramic corresponding to the complex surface shape as a corresponding output of the neural network. Training times of the neural network are consistent with a number of the samples. Finally, the trained neural network is obtained to verify the training effect of the neural network. According to the characterization parameters of the (Continued)

required surface, the neural network is used to control the deformable mirror to generate the required surface.

8 Claims, 2 Drawing Sheets

(56) References Cited

FOREIGN PATENT DOCUMENTS

| CN | 110648298 A | 1/2020 |
|---|---|---|
| CN | 110715619 A | 1/2020 |
| CN | 111340184 A | 6/2020 |

* cited by examiner

METHOD AND MEANS FOR CONTROLLING DEFORMABLE MIRROR SURFACE SHAPE BASED ON RADIAL PRIMARY FUNCTION

CROSS REFERENCE TO THE RELATED APPLICATIONS

This application is the national stage entry of International Application No. PCT/CN2021/075988, filed on Feb. 8, 2021, which is based upon and claims priority to Chinese Patent Application No. 202010089331.2, filed on Feb. 12, 2020, the entire contents of which are incorporated herein by reference.

TECHNICAL FIELD

The invention relates to the technical field of photoelectric detection, in particular to a method for controlling deformable mirror surface shape based on radial primary function, which aims to control the surface shape of deformable mirror by using radial primary function through neural network to form a new method for controlling deformable mirror surface shape, and also relates to a means for controlling deformable mirror surface shape.

BACKGROUND

Deformable mirror (DM) is a wavefront correction component. The original purpose of developing deformable mirror was to solve the wavefront correction problem of optical system in the field of adaptive optics. The original deformable mirror has a simple structure. A thin oil film is covered on the mirror, and the oil film is distorted by the spatial distribution of electrostatic charge, resulting in different surface shapes. With the advancement of laser and military research, deformable mirror has been widely used and made great progress. Its structure has been gradually improved and its manufacturing technology has been improved day by day. With the progress of computer science and micro electro mechanical system (MEMS) technology, deformable mirrors become more and more lightweight, simple structure and low power consumption.

At present, the structure composition and working principle of common deformable mirrors are as follows: taking silicon as the substrate, the actuators are orderly attached to the substrate according to certain rules, and a layer of flexible reflector is attached to the surface of the actuators. When the deformable mirror works, the shape of the flexible reflector is changed by controlling the displacement of the actuators to achieve the deformation of the deformable mirror. By controlling the displacement change combination of orderly arranged actuators, various types of surface shapes can be realized. At present, most deformable mirrors use piezoelectric ceramics as actuators to ensure that deformable mirrors can produce high-precision surface shape quickly and flexibly.

At present, deformable mirrors are mostly used in the research fields of adaptive optics and astronomy to correct the wavefront distortion caused by atmospheric turbulence. In the research field of optical element surface shape detection, deformable mirror is also used as compensation component to compensate system aberration and realize the purpose of surface shape detection.

At present, the control methods of deformable mirror are mostly based on the way to solve the influence function matrix. The purpose of deformable mirror shape control can be realized through this kind of method. However, the solution of the influence function matrix is complex and needs enough samples and complex mathematical analysis process. Moreover, the influence function matrices corresponding to different deformable mirrors are inconsistent and have great differences. In addition to the way to solve the influence function matrix, neural network can also be used to control the deformable mirror. At present, the existing neural network control methods of deformable mirror mostly take the surface shape data of deformable mirror as the input of neural network and the corresponding actuator voltage value as the output of neural network. The disadvantage of this kind of method is that too much surface shape data leads to a large amount of calculation, and it is only applicable to relatively simple surface shapes, such as those with small surface slope, that is, those with relatively flat surface shape fluctuation. However, in the practical application of various research fields such as adaptive optics, astronomy and optical element surface shape detection, deformable mirrors are required to generate more complex surface shapes, such as surface shapes with large surface slope, i.e. surfaces with severe surface shape fluctuation and free-form surfaces. This kind of method can not meet this kind of situation.

At present, the difficulty of deformable mirror control is to study a control method which has the advantages of simple calculation, easy implementation, strong universality and can control the generation of complex surface shape of deformable mirror with high precision, so as to realize the complex functions of wavefront correction and aberration compensation.

SUMMARY

In order to overcome the defects of the prior art, the technical problem to be solved by the invention is to provide a method for controlling deformable mirror surface shape based on radial primary function, which has the advantages of simple calculation, easy implementation, strong universality and can control the generation of complex surface shape of deformable mirror with high precision, so as to realize the complex functions of wavefront correction and aberration compensation.

The technical scheme of the invention is as follows. The method for controlling deformable mirror surface shape based on radial primary function comprises the following steps:

(1) Input the structural characteristics and control parameters of the deformable mirror. The structural characteristics are the characteristics related to the shape change of the deformable mirror. The control parameters refer to the relevant parameters that control the deformable mirror to work within the maximum stroke.

(2) Input the sample quantity and distribution of the neural network training set. The sample quantity of the neural network training set is the training times of the neural network in the training process. The sample distribution of the neural network training set is the distribution of the total control voltage corresponding to the sample within the total control voltage range of the deformable mirror.

(3) According to the number and distribution of samples, the samples of neural network training set are obtained. The samples of neural network training set are the surface shape of deformable mirror and the total control voltage corresponding to the surface shape.

(4) The samples of neural network training set are processed to obtain the elements of neural network training set. The samples of neural network training set correspond to the elements of neural network training set. The samples of neural network training set are processed. The surface shape of deformable mirror in each sample is characterized by radial primary function, and each surface shape is characterized as formula (1).

$$z(x, y) = \frac{c(x^2 + y^2)}{1 + \sqrt{1 - (1+k)c^2(x^2 + y^2)}} + \sum_i w_i \varphi_i \left( \left\| \vec{r} - \vec{r}_i \right\| \right) \quad (1)$$

Wherein z(x,y) is the surface shape of the deformable mirror, (x,y) is the coordinate of the Descartes coordinate system, c is the vertex curvature, k is the coefficient of the quadric surface, $w_i$ is the coefficient, $$\varphi_i \left( \left\| \vec{r} - \vec{r}_i \right\| \right)$$

is the radial primary function, $$\frac{1}{\vec{r}}$$

is the vector pointing to any direction in the aperture, $$\frac{1}{\vec{r}_i}$$

is the vector pointing to the center of the radial primary function ‖ ‖ is the Euclidean norm, and i is the number of radial primary functions.

(5) Input neural network type.

(6) The neural network is trained by using the training set elements. According to the training set elements obtained in step (4), the characterization parameters of the surface generated by the deformable mirror are used as the input of the neural network, and the voltage of each piezoelectric ceramic corresponding to the surface is used as the corresponding output of the neural network to train the neural network. The training times of the neural network are consistent with the number of samples. Finally, the trained neural network is obtained.

(7) Verify the training effect of neural network, obtain the neural network verification sample, and characterize the surface shape of deformable mirror in the verification sample by using radial primary function, so as to obtain the characterization parameters of the surface shape.

(8) The neural network is used to control the deformable mirror to generate the required surface shape, and the characterization parameters are sent to the trained neural network as input to obtain the corresponding output. According to the output, the deformable mirror is controlled to generate the required surface shape.

The invention processes the neural network training set samples, obtains the neural network training set elements, characterizes the surface shape of the deformable mirror in each sample by using the radial primary function, takes the characterization parameters of the surface shape generated by the deformable mirror as the input of the neural network, and takes the voltage of each piezoelectric ceramic corresponding to the surface as the corresponding output of the neural network. When training the neural network, the training times of the neural network are consistent with the number of samples. Finally obtain the trained neural network, verify the training effect of the neural network, obtain the characterization parameters of the surface shape, and use the neural network to control the deformable mirror to generate the required surface shape. The surface shape can be characterized only by the characterization parameters, and it is used as the training set element to train the neural network, which simplifies the calculation cost and is simple. The complex mathematical analysis process is avoided, which makes the method easy to implement. The control method is applicable to deformable mirrors using piezoelectric ceramics as actuators. The radial primary function can more accurately characterize the surface shape, especially the complex surface shape. Therefore, according to this control method, more complex surface shapes can be generated, such as the surface shape with large surface slope, that is, the surface with severe surface shape fluctuation and free-form surface, and so on.

A means for controlling deformable mirror surface shape based on radial primary function is also provided, comprising:

inputting module for structure characteristics and control parameter of deformable mirror, is configured to input the structural characteristics and control parameters of the deformable mirror. The structural characteristics are the characteristics related to the shape change of the deformable mirror. The control parameters refer to the relevant parameters that control the deformable mirror to work within the maximum stroke.

inputting module for the sample quantity and distribution of the neural network training set, is configured to input the sample quantity and distribution of the neural network training set. The sample quantity of the neural network training set is the training times of the neural network in the training process. The sample distribution of the neural network training set is the distribution of the total control voltage corresponding to the sample within the total control voltage range of the deformable mirror.

obtaining module for the sample quantity and distribution of the neural network training set, is configured to obtain the samples of neural network training set according to the number and distribution of samples. The samples of neural network training set are the surface shape of deformable mirror and the total control voltage corresponding to the surface shape.

processing module for the samples of neural network training set, is configured to process to obtain the elements of neural network training set. The samples of neural network training set correspond to the elements of neural network training set. The samples of neural network training set are processed. The surface shape of deformable mirror in each sample is characterized by radial primary function, and each surface shape is characterized as formula (1).

$$z(x, y) = \frac{c(x^2 + y^2)}{1 + \sqrt{1 - (1+k)c^2(x^2 + y^2)}} + \sum_i w_i \varphi_i \left( \left\| \vec{r} - \vec{r}_i \right\| \right) \quad (1)$$

Wherein z(x,y) is the surface shape of the deformable mirror, (x,y) is the coordinate of the Descartes coordinate system, c is the vertex curvature, k is the coefficient of the quadric surface, $w_i$ is the coefficient, $$\varphi_i\left(\left\|\frac{r\ r}{r-r_i}\right\|\right)$$

is the radial primary function, $$\frac{1}{r}$$

is the vector pointing to any direction in the aperture, $$\frac{1}{r_i}$$

is the vector pointing to the center of the radial primary function, ‖ ‖ is the Euclidean norm, and i is the number of radial primary functions.

inputting module for neural network type, is configured to input neural network type.

training module for the neural network, is configured to train the neural network by using the training set elements. According to the training set elements obtained in processing module, the characterization parameters of the surface generated by the deformable mirror are used as the input of the neural network, and the voltage of each piezoelectric ceramic corresponding to the surface is used as the corresponding output of the neural network to train the neural network. The training times of the neural network are consistent with the number of samples. Finally, the trained neural network is obtained.

verifying module for the training effect of neural network, is configured to verify the training effect of neural network, obtain the neural network verification sample, and characterize the surface shape of deformable mirror in the verification sample by using radial primary function, so as to obtain the characterization parameters of the surface shape.

generating module for the surface shape, is configured to control the deformable mirror to generate the required surface shape by using neural network, and the characterization parameters are sent to the trained neural network as input to obtain the corresponding output. According to the output, the deformable mirror is controlled to generate the required surface shape.

Wherein, 1-52 are piezoelectric ceramics, 53—flexible reflecting surface, 54—piezoelectric ceramics in actuated state, and 55—silicon substrate.

DETAILED DESCRIPTION OF THE EMBODIMENTS

Figure 1:
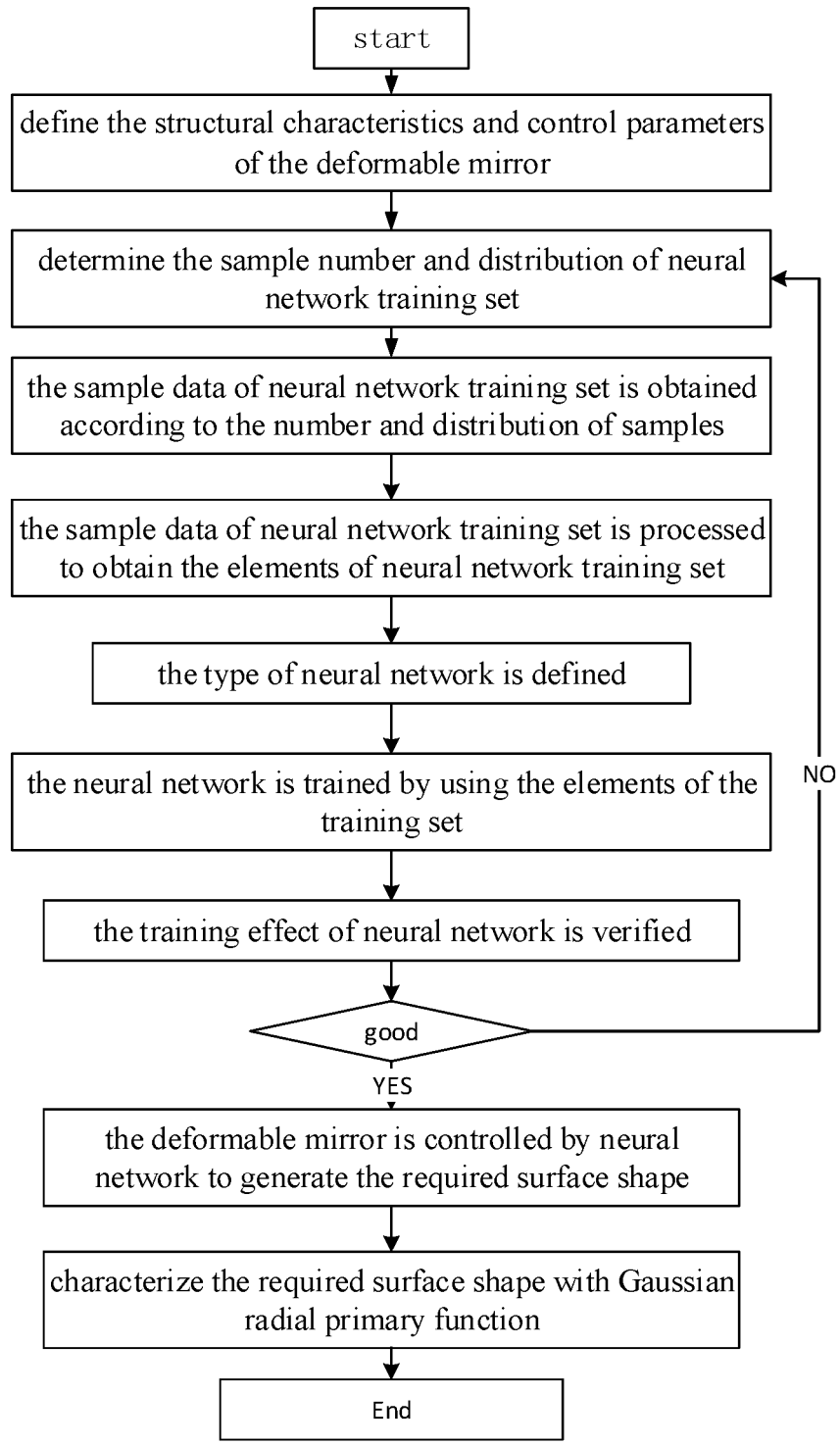
FIG. 1 is a flowchart of the method for controlling deformable mirror surface shape based on radial primary function according to the present invention.

As shown in FIG. 1, the method for controlling deformable mirror surface shape based on radial primary function comprises the following steps:

(1) Input the structural characteristics and control parameters of the deformable mirror. The structural characteristics are the characteristics related to the shape change of the deformable mirror. The control parameters refer to the relevant parameters that control the deformable mirror to work within the maximum stroke.

(2) Input the sample quantity and distribution of the neural network training set. The sample quantity of the neural network training set is the training times of the neural network in the training process. The sample distribution of the neural network training set is the distribution of the total control voltage corresponding to the sample within the total control voltage range of the deformable mirror.

(3) According to the number and distribution of samples, the samples of neural network training set are obtained. The samples of neural network training set are the surface shape of deformable mirror and the total control voltage corresponding to the surface shape.

(4) The samples of neural network training set are processed to obtain the elements of neural network training set. The samples of neural network training set correspond to the elements of neural network training set. The samples of neural network training set are processed. The surface shape of deformable mirror in each sample is characterized by radial primary function, and each surface shape is characterized as formula (1).

$$z(x,y) = \frac{c(x^2+y^2)}{1+\sqrt{1-(1+k)c^2(x^2+y^2)}} + \sum_i w_i \varphi_i\left(\left\|\frac{r\ r}{r-r_i}\right\|\right) \quad (1)$$

Wherein z(x,y) is the surface shape of the deformable mirror, (x,y) is the coordinate of the Descartes coordinate system, c is the vertex curvature, k is the coefficient of the quadric surface, $w_i$ is the coefficient, $$\frac{1}{r}$$

is the radial primary function, $$\varphi_i\left(\left\|\frac{r\ r}{r-r_i}\right\|\right)$$

is the vector pointing to any direction in the aperture, $$\frac{1}{r_i}$$

is the vector pointing to the center of the radial primary function, ‖ ‖ is the Euclidean norm, and i is the number of radial primary functions.

(5) Input neural network type.

(6) The neural network is trained by using the training set elements. According to the training set elements obtained in step (4), the characterization parameters of the surface generated by the deformable mirror are used as the input of the neural network, and the voltage of each piezoelectric ceramic corresponding to the surface is used as the corresponding output of the neural network to train the neural network. The training times of the neural network are consistent with the number of samples. Finally, the trained neural network is obtained.

(7) Verify the training effect of neural network, obtain the neural network verification sample, and characterize the surface shape of deformable mirror in the verification sample by using radial primary function, so as to obtain the characterization parameters of the surface shape.

(8) The neural network is used to control the deformable mirror to generate the required surface shape, and the characterization parameters are sent to the trained neural network as input to obtain the corresponding output. According to the output, the deformable mirror is controlled to generate the required surface shape.

The invention processes the neural network training set samples, obtains the neural network training set elements, characterizes the surface shape of the deformable mirror in each sample by using the radial primary function, takes the characterization parameters of the surface shape generated by the deformable mirror as the input of the neural network, and takes the voltage of each piezoelectric ceramic corresponding to the surface as the corresponding output of the neural network. When training the neural network, the training times of the neural network are consistent with the number of samples, Finally obtain the trained neural network, verify the training effect of the neural network, obtain the characterization parameters of the surface shape, and use the neural network to control the deformable mirror to generate the required surface shape. The surface shape can be characterized only by the characterization parameters, and it is used as the training set element to train the neural network, which simplifies the calculation cost and is simple. The complex mathematical analysis process is avoided, which makes the method easy to implement. The control method is applicable to deformable mirrors using piezoelectric ceramics as actuators. The radial primary function can more accurately characterize the surface shape, especially the complex surface shape. Therefore, according to this control method, more complex surface shapes can be generated, such as the surface shape with large surface slope, that is, the surface with severe surface shape fluctuation and free-form surface, and so on.

Preferably, in step (1), the structural characteristics include the aperture of the deformable mirror, the maximum stroke and the number of PZT piezoelectric ceramics, and the control parameters include the total control voltage range and the corresponding voltage coefficient of each piezoelectric ceramic.

Preferably, in step (2), the samples of the neural network training set are evenly distributed.

Preferably, in step (3), the surface interferometer is used to obtain the surface shape of the deformable mirror, the total control voltage corresponding to the surface shape is obtained according to the sample distribution, and the samples of the neural network training set are obtained according to the number and distribution of samples.

Preferably, in step (4), the radial primary function in Gaussian form is used to characterize the surface shape of the deformable mirror, which is formula (2).

$$z(x, y) = \frac{c(x^2 + y^2)}{1 + \sqrt{1 - (1+k)c^2(x^2 + y^2)}} + \sum_i w_i e^{-\varepsilon_i^2((x-x_{0i})^2 + (y-y_{0i})^2)} \quad (2)$$

Wherein, $\varepsilon_i$ is the shape factor of the Gaussian radial primary function and $(x_{0i}, y_{0i})$ is the center point of the Gaussian radial basis function. A certain surface shape is determined according to the parameters $c$, $k$, $w_i$, $\varepsilon_i$ and $(x_{0i}, y_{0i})$. After the surface shape of the deformable mirror in each sample is characterized by the radial primary function, the characterization parameters characterizing the surface are obtained, and the obtained characterization parameters are used as the elements of the neural network training set. At the same time, according to the total control voltage in each sample, the voltage of each piezoelectric ceramic corresponding to the surface shape in each sample is obtained by using the voltage coefficient of each piezoelectric ceramic as the element of neural network training set.

Preferably, in step (5), the neural network type adopts back propagation neural network.

Preferably, in step (7), the characterization parameters of the surface shape of the deformable mirror in the verification sample are input into the trained neural network, and the trained neural network obtains the corresponding output according to the input, and the output is the theoretical voltage of each piezoelectric ceramic.

Compare the theoretical voltage of each piezoelectric ceramic output by the neural network with the actual voltage of each piezoelectric ceramic corresponding to the surface shape of the deformable mirror in the verification sample, analyze the deviation, and verify the neural network training effect. If the deviation is small, verify that the neural network training effect is good. If the deviation is large, readjust the number and distribution of samples, and operate steps (2)-(7) in turn until a neural network with good training effect is obtained.

Those skilled in the art can understand that all or part of the steps in the method of realizing the above embodiment can be completed by instructing relevant hardware through a program. The program can be stored in a computer-readable storage medium. When the program is executed, it includes the steps of the method of the above embodiment, and the storage medium can be ROM/RAM, magnetic disc, optical disc, memory card, etc. Therefore, corresponding to the method of the invention, the invention also includes means for controlling deformable mirror surface shape based on radial primary function, which is usually represented in the form of functional modules corresponding to each step of the method. The means comprises:

inputting module for structure characteristics and control parameter of deformable mirror, is configured to input the structural characteristics and control parameters of the deformable mirror. The structural characteristics are the characteristics related to the shape change of the deformable mirror. The control parameters refer to the relevant parameters that control the deformable mirror to work within the maximum stroke.

inputting module for the sample quantity and distribution of the neural network training set, is configured to input the sample quantity and distribution of the neural network training set. The sample quantity of the neural network training set is the training times of the neural network in the training process. The sample distribution of the neural network training set is the distribution of the total control voltage corresponding to the sample within the total control voltage range of the deformable mirror.

obtaining module for the sample quantity and distribution of the neural network training set, is configured to obtain the samples of neural network training set according to the number and distribution of samples. The samples of neural network training set are the surface shape of deformable mirror and the total control voltage corresponding to the surface shape.

processing module for the samples of neural network training set, is configured to process to obtain the elements of neural network training set. The samples of neural network training set correspond to the elements of neural network training set. The samples of neural network training set are processed. The surface shape of deformable mirror in each sample is characterized by radial primary function, and each surface shape is characterized as formula (1).

$$z(x, y) = \frac{c(x^2 + y^2)}{1 + \sqrt{1 - (1+k)c^2(x^2 + y^2)}} + \sum_i w_i \varphi_i(\|\vec{r} - \vec{r}_i\|) \quad (1)$$

Wherein $z(x,y)$ is the surface shape of the deformable mirror, $(x,y)$ is the coordinate of the Descartes coordinate system, c is the vertex curvature, k is the coefficient of the quadric surface, $w_i$ is the coefficient, $$\varphi_i(\|\vec{r} - \vec{r}_i\|)$$

is the radial primary function, $$\vec{r}$$

is the vector pointing to any direction in the aperture, $$\vec{r}_i$$

is the vector pointing to the center of the radial primary function, ‖ ‖ is the Euclidean norm, and i is the number of radial primary functions.

inputting module for neural network type, is configured to input neural network type.

training module for the neural network, is configured to train the neural network by using the training set elements. According to the training set elements obtained in processing module, the characterization parameters of the surface generated by the deformable mirror are used as the input of the neural network, and the voltage of each piezoelectric ceramic corresponding to the surface is used as the corresponding output of the neural network to train the neural network. The training times of the neural network are consistent with the number of samples. Finally, the trained neural network is obtained.

verifying module for the training effect of neural network, is configured to verify the training effect of neural network, obtain the neural network verification sample, and characterize the surface shape of deformable mirror in the verification sample by using radial primary function, so as to obtain the characterization parameters of the surface shape.

generating module for the surface shape, is configured to control the deformable mirror to generate the required surface shape by using neural network, and the characterization parameters are sent to the trained neural network as input to obtain the corresponding output. According to the output, the deformable mirror is controlled to generate the required surface shape.

A specific embodiment of the present invention is described in detail below. The method for controlling deformable mirror surface shape based on radial primary function is realized in the following ways.

The process of establishing the method for controlling deformable mirror surface shape based on radial primary function is shown in FIG. 1. The specific implementation steps are as follows:

Step 1: define the structural characteristics and control parameters of the deformable mirror.

The structural characteristics include the aperture of deformable mirror, the maximum stroke and the number of piezoelectric ceramics (PZT). The control parameters include the total control voltage range and the corresponding voltage distribution weight of each piezoelectric ceramic.

Figure 2:
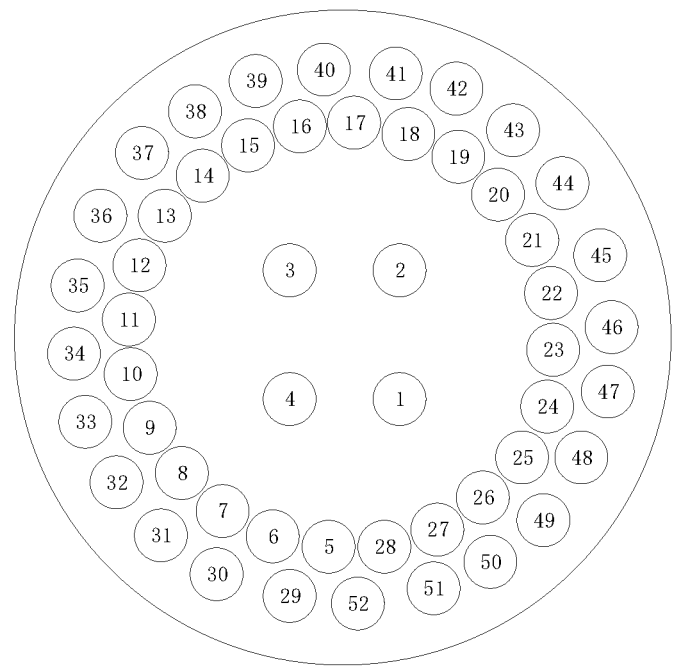
FIG. 2 is a schematic diagram of the distribution of piezoelectric ceramics of deformable mirror.

The aperture of the deformable mirror is 2D=50 mm and the maximum stroke is 51 μm. According to the distribution of piezoelectric ceramics shown in FIG. 2, the number of piezoelectric ceramics is 52. The total control voltage range is [−300V, 300V], and the corresponding voltage coefficient of each piezoelectric ceramic is: $W_1$=−0.610269, $W_2$=0.408786, $W_4$=−0.596565, $W_5$=0.594806, $W_6$=0.380205, $W_7$=−0.850296, $W_8$=0339582, $W_9$=−0.489712, $W_{10}$=−0.377607, $W_{11}$=0.0996519, $W_{12}$=−0.32643, $W_{13}$=0.36092, $W_{14}$=0130899, $W_{15}$=0.402004, $W_{16}$=0.024341, $W_{17}$=0.161244, $W_{18}$=−0.0949442, $W_{19}$=−0.100865, $W_{20}$=−0.364176, $W_{21}$=0.0608037, $W_{22}$=−0.133405, $W_{23}$=0.221137, $W_{24}$=−0.0154992, $W_{25}$=0.348289, $W_{26}$=0.393354, $W_{27}$=−0 0592329, $W_{28}$=0.52579, $W_{29}$=−0.6441281, $W_{30}$=0.485263, $W_{31}$=0.140236, $W_{32}$=−0.404837, $W_{33}$=−0.381701, $W_{34}$=0.735662, $W_{35}$=−0.419159, $W_{36}$=−0.746531, $W_{37}$=0.139333, $W_{38}$=0.0945635, $W_{39}$=0.200622, $W_{40}$=0.526332, $W_{41}$=0.288645, $W_{42}$=−0.120834, $W_{43}$=−0.303413, $W_{44}$=−0.34312, $W_{45}$=−0.493974, $W_{46}$=−0.427523, $W_{47}$=−0.121015, $W_{48}$=−0.0330456, $W_{49}$=0.308999, $W_{50}$=0.677892, $W_{51}$=0.936302, $W_{52}$=0.723971.

Step 2: determine the sample number and distribution of neural network training set.

The selected number of samples is k=200, and the samples are evenly distributed within the total control voltage range according to the number of samples. Taking (300−(−300))/200=6V as the step value, the samples are evenly distributed within the range of total control voltage, and the total control voltage corresponding to each sample is:

$$V_{k,total} = -300V, -204V, -198V, L, 300V (k=1,2,3,L200)$$

Step 3: the sample data of neural network training set is obtained according to the number and distribution of samples.

Figure 3:
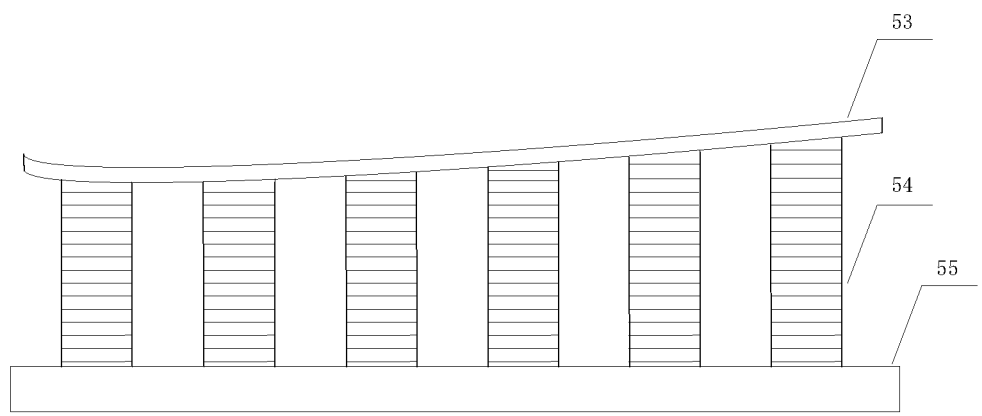
FIG. 3 is a schematic diagram of the working principle of deformable mirror.

According to the total control voltage corresponding to the sample distribution of the training set, the surface shape of the deformable mirror can be changed, and its working principle is shown in FIG. 3. The Zygo surface interferometer is used to measure each sample, that is, the surface shape of the deformable mirror under each total control voltage. The wavefront data measured by Zygo surface interferometer is derived, which is the surface data of each sample. The sample data of neural network training set can be obtained by successively measuring 1~200 samples according to the sample distribution and saving the corresponding wavefront data and total control voltage data.

Step 4: the sample data of neural network training set is processed to obtain the elements of neural network training set.

Gaussian primary basis function is used to fit the wavefront data of the surface corresponding to each sample, that is, the surface corresponding to each sample is characterized by Gaussian radial primary function:

$$z(x, y) = \frac{c(x^2 + y^2)}{1 + \sqrt{1 - (1 + k)c^2(x^2 + y^2)}} + \sum_i w_i \varphi_i(\|\vec{r} - \vec{r_i}\|)$$

Therefore, the surface shape corresponding to each sample can be determined by the characterization parameters c、k、$w_i$、$\varepsilon_i$ and ($x_{0i}$, $y_{0i}$).

The voltage of each piezoelectric ceramic corresponding to each sample is:

$$V_j = V_{k,total} * W_j (j=1,2,3,L52; k=1,2,3,L200)$$

The characterization parameters corresponding to each sample and the voltage of each piezoelectric ceramic are the elements of the neural network training set.

Step 5: the type of neural network is defined.

Back propagation neural network is used.

Step 6: the neural network is trained by using the elements of the training set.

Using the training set elements obtained in step 4, the characterization parameters c, k, $w_i$, $\varepsilon_i$ and ($x_{0i}$, $y_{0i}$) corresponding to each sample are used as the input of the neural network, and the voltage $V_j$, j=1, 2, 3, L 52 of each piezoelectric ceramic corresponding to each sample is used as the corresponding output of the neural network. The neural network is trained 200 times to obtain the neural network that has completed the training.

Step 7: the training effect of neural network is verified.

Obtain the verification sample, set the total control voltage of the deformable mirror to −298V, measure the surface shape of the deformable mirror at this time with Zygo surface interferometer, save the wavefront data, fit the wavefront data with the Gaussian radial primary function, and obtain the characterization parameters c、k、$w_i$、$\varepsilon_i$ and ($x_{0i}$, $y_{0i}$). The characterization parameters are input into the trained neural network to obtain the output, which is the theoretical control voltage of each piezoelectric ceramic when the deformable mirror is needed to generate the surface shape.

The total control voltage is multiplied by the corresponding voltage coefficient of each piezoelectric ceramic to obtain the actual voltage of each piezoelectric ceramic.

Compare the output theoretical voltage with actual voltage of each piezoelectric ceramic neural network, and analyze the difference. If the difference is small, the training effect of neural network is better. If the difference is large, readjust the number and distribution of samples, and operate step 2~step 7 in turn until a neural network with good training effect is obtained.

Step 8: the deformable mirror is controlled by neural network to generate the required surface shape.

Determine the required surface shape, characterize the required surface shape with Gaussian radial primary function, and clarify the characterization parameters of the surface shape. The characterization parameters are input into the neural network to obtain the control voltage of each piezoelectric ceramic. The voltage of each piezoelectric ceramic is set according to the output, and the deformable mirror is controlled to generate the required surface shape.

Combining the above steps, the surface shape control of the deformable mirror can be realized.

The calculation of the invention is simple, the surface shape can be characterized only by the characterization parameters, and the characterization parameters are used as training set elements to train the neural network, which greatly simplifies the calculation cost. The control is realized by neural network, which avoids the complex mathematical analysis process and makes the method easy to implement. This method can be used for deformable mirrors using piezoelectric ceramics as actuators, and this method has strong universality. Because the radial basis function is used to characterize the surface shape, the complex surface shape can be characterized with high precision. Therefore, the complex surface shape with high precision can be generated according to this method, such as the surface shape with large surface slope, that is, the surface with severe surface shape fluctuation and free-form surface.

The above contents are only the preferable embodiments of the present invention, and do not limit the present invention in any manner. Any improvements, amendments and alternative changes made to the above embodiments according to the technical spirit of the present invention shall fall within the claimed scope of the present invention.

What is claimed is:

1. A method for controlling a deformable mirror surface shape based on a radial primary function, comprising the following steps:

(1) inputting structural characteristics and control parameters of a deformable mirror, wherein the structural characteristics are characteristics related to a shape change of the deformable mirror, the control parameters are relevant parameters controlling the deformable mirror to work within a maximum stroke;

(2) inputting a sample quantity and a sample distribution of a neural network training set, wherein the sample quantity of the neural network training set is training times of a neural network in a training process, the sample distribution of the neural network training set is a distribution of a total control voltage corresponding to a sample within a total control voltage range of the deformable mirror;

(3) according to a number and distribution of samples, obtaining samples of the neural network training set, wherein the samples of the neural network training set are a surface shape of the deformable mirror and the total control voltage corresponding to the surface shape;

(4) processing the samples of the neural network training set to obtain elements of the neural network training set, wherein the samples of the neural network training set correspond to the elements of the neural network training set, processing the samples of neural network training set to characterize the surface shape of deformable mirror in each sample by a radial primary function, and each surface shape is characterized as formula (1);

$$z(x, y) = \frac{c(x^2 + y^2)}{1 + \sqrt{1 - (1 + k)c^2(x^2 + y^2)}} + \sum_i w_i \varphi_i(\|\vec{r} - \vec{r_i}\|); \quad (1)$$

wherein z(x,y) is the surface shape of the deformable mirror, (x,y) is a coordinate of a Descartes coordinate system, c is a vertex curvature, k is a coefficient of a quadric surface, $w_i$ is a coefficient, $$\varphi_i(\|\vec{r} - \vec{r}_i\|)$$

is the radial primary function, $$\frac{1}{\vec{r}}$$

is a first vector pointing to any direction in an aperture, $$\frac{1}{\vec{r}_i}$$

is a second vector pointing to a center of the radial primary function, $\|\cdot\|$ is an Euclidean norm, and i is a number of radial primary functions;

(5) inputting a neural network type;

(6) training the neural network by using the elements of the neural network training set, according to the elements of the neural network training set obtained in step (4), using characterization parameters of the surface shape generated by the deformable mirror as an input of the neural network, and using a voltage of each piezoelectric ceramic corresponding to the surface shape as a corresponding output of the neural network to train the neural network, wherein the training times of the neural network are consistent with the number of the samples, finally, obtaining a trained neural network;

(7) verifying a training effect of the trained neural network, obtaining a neural network verification sample, and characterizing the surface shape of the deformable mirror in the neural network verification sample by using the radial primary function to obtain the characterization parameters of the surface shape; and (8) using the trained neural network to control the deformable mirror to generate a required surface shape, and sending the characterization parameters to the trained neural network as an input to obtain the corresponding output, according to the corresponding output, controlling the deformable mirror to generate the required surface shape.

2. The method according to claim 1, wherein in step (1), the structural characteristics comprise the aperture of the deformable mirror, the maximum stroke and a number of piezoelectric ceramics (PZT), and the control parameters comprise the total control voltage range and a corresponding voltage coefficient of the each piezoelectric ceramic.

3. The method according to claim 2, wherein in step (2), the samples of the neural network training set are evenly distributed.

4. The method according to claim 3, wherein in step (3), a surface interferometer is used to obtain the surface shape of the deformable mirror, the total control voltage corresponding to the surface shape is obtained according to the sample distribution, and the samples of the neural network training set are obtained according to the sample quantity and the sample distribution.

5. The method according to claim 4, wherein in step (4), the radial primary function in a Gaussian form is used to characterize the surface shape of the deformable mirror with a formula (2), and the formula (2) is as follows:

$$z(x, y) = \frac{c(x^2 + y^2)}{1 + \sqrt{1 - (1+k)c^2(x^2 + y^2)}} + \sum_i w_i e^{-\varepsilon_i^2((x-x_{0i})^2 + (y-y_{0i})^2)}; \quad (2)$$

wherein, $\varepsilon_i$ is a shape factor of a Gaussian radial primary function and $(x_{0i}, y_{0i})$ is a center point of a Gaussian radial basis function, a certain surface shape is determined according to parameters c, k, $w_i$, $\varepsilon_i$ and $(x_{0i}, y_{0i})$, after the surface shape of the deformable mirror in the each sample is characterized by the radial primary function, the characterization parameters for characterizing the surface shape are obtained, and the characterization parameters are used as the elements of the neural network training set; according to the total control voltage in the each sample, the voltage of the each piezoelectric ceramic corresponding to the surface shape in the each sample is obtained by using the corresponding voltage coefficient of the each piezoelectric ceramic as the elements of the neural network training set.

6. The method according to claim 5, wherein in step (5), the neural network type adopts a back propagation neural network.

7. The method according to claim 6, wherein in step (7), the characterization parameters of the surface shape of the deformable mirror in the neural network verification sample are input into the trained neural network, and the trained neural network obtains the corresponding output according to the input, and the corresponding output is a theoretical voltage of the each piezoelectric ceramic;

the theoretical voltage of the each piezoelectric ceramic output by the trained neural network is compared with an actual voltage of the each piezoelectric ceramic corresponding to the surface shape of the deformable mirror in the neural network verification sample, a deviation is analyzed to verify the training effect of the trained neural network training, wherein when the deviation is small, the training effect of the neural network is verified to be good, when the deviation is large, the sample quantity and the sample distribution is readjusted, and steps (2)-(7) are repeated in turn until the trained neural network with a good training effect is obtained.

8. A Means for controlling a deformable mirror surface shape based on a radial primary function, comprises:

a first inputting module for structure characteristics and control parameters of a deformable mirror, configured to input the structural characteristics and the control parameters of the deformable mirror, wherein the structural characteristics are characteristics related to a shape change of the deformable mirror, the control parameters refer to relevant parameters controlling the deformable mirror to work within a maximum stroke;

a second inputting module for a sample quantity and distribution of a neural network training set, configured to input the sample quantity and distribution of the neural network training set, wherein the sample quantity of the neural network training set is training times of a neural network in a training process, the sample distribution of the neural network training set is a distribution of a total control voltage corresponding to a sample within a total control voltage range of the deformable mirror;

an obtaining module for the sample quantity and distribution of the neural network training set, configured to obtain samples of the neural network training set according to a number and distribution of the samples, wherein the samples of the neural network training set are a surface shape of the deformable mirror and the total control voltage corresponding to the surface shape;

a processing module for the samples of the neural network training set, configured to process to obtain elements of the neural network training set, wherein the samples of the neural network training set correspond to the elements of the neural network training set, the samples of the neural network training set are processed to characterize the surface shape of the deformable mirror in each sample by a radial primary function, and each surface shape is characterized as formula (1);

$$z(x, y) = \frac{c(x^2 + y^2)}{1 + \sqrt{1 - (1+k)c^2(x^2 + y^2)}} + \sum_i w_i \varphi_i(\|\vec{r} - \vec{r_i}\|); \quad (1)$$

wherein z(x,y) is the surface shape of the deformable mirror, (x,y) is a coordinate of a Descartes coordinate system, c is a vertex curvature, k is a coefficient of a quadric surface, $w_i$ is a coefficient, $$\varphi_i(\|\vec{r} - \vec{r_i}\|)$$

is the radial primary function, $$\frac{1}{\vec{r}}$$

is a first vector pointing to any direction in an aperture, $$\frac{1}{\vec{r_i}}$$

is a second vector pointing to a center of the radial primary function, $\|\ \|$ is a Euclidean norm, and i is a number of radial primary functions;

a third inputting module for a neural network type, configured to input the neural network type;

a training module for the neural network, configured to train the neural network by using the elements of the neural network training set, wherein according to the elements of the neural network training set obtained in the processing module, the characterization parameters of the surface shape generated by the deformable mirror are used as an input of the neural network, and a voltage of each piezoelectric ceramic corresponding to the surface shape is used as a corresponding output of the neural network to train the neural network, the training times of the neural network are consistent with the number of the samples, finally, a trained neural network is obtained;

a verifying module for a training effect of the trained neural network, configured to verify the training effect of the trained neural network, obtain a neural network verification sample, and characterize the surface shape of the deformable mirror in the neural network verification sample by using the radial primary function to obtain the characterization parameters of the surface shape;

a generating module for the surface shape, configured to control the deformable mirror to generate a required surface shape by using the trained neural network, wherein the characterization parameters are sent to the trained neural network as the input to obtain the corresponding output, according to the corresponding output, the deformable mirror is controlled to generate the required surface shape.

\* \* \* \* \*